United States Patent
Vitale et al.

[11] Patent Number: 5,639,106
[45] Date of Patent: Jun. 17, 1997

[54] TRACTOR-TRAILER FIFTH WHEEL AIR SUSPENSION ASSEMBLY

[76] Inventors: Frank Vitale; Ralph Vitale, both of 164 Beacon Ave., New Haven, Conn. 06512

[21] Appl. No.: 444,214

[22] Filed: May 18, 1995

[51] Int. Cl.$^6$ .................................................. B62D 53/08
[52] U.S. Cl. ..................... 280/407; 280/438.1; 280/439; 280/441
[58] Field of Search ........................... 280/405.1, 406.1, 280/407.1, 407, 438.1, 439, 441, 440, 483, 711; 267/132

[56] References Cited

U.S. PATENT DOCUMENTS

| | | | |
|---|---|---|---|
| 2,821,409 | 1/1958 | Chalmers | 280/440 |
| 3,197,237 | 7/1965 | Smith | 280/407.1 |
| 3,227,470 | 1/1966 | Funk | 280/440 |
| 3,380,758 | 4/1968 | Granning | 286/438.1 |
| 4,070,033 | 1/1978 | Wier et al. | 280/476.1 |
| 4,279,430 | 7/1981 | Tagg et al. | 280/439 |
| 4,580,806 | 4/1986 | Kolstad et al. | 280/441 |
| 4,838,753 | 6/1989 | Gehman et al. | 280/402 |
| 4,961,564 | 10/1990 | Schult et al. | 267/64.22 |
| 5,060,964 | 10/1991 | Vick | 280/421 |
| 5,062,617 | 11/1991 | Campbell | 267/132 |
| 5,203,850 | 4/1993 | Harrold | 280/438.1 |
| 5,226,675 | 7/1993 | Noah et al. | 280/439 |
| 5,344,173 | 9/1994 | Beeler | 280/438.1 |
| 5,449,191 | 9/1995 | Cattau | 280/441 |

*Primary Examiner*—Anne Marie Boehler
*Attorney, Agent, or Firm*—Fattibene and Fattibene; Arthur T. Fattibene; Paul A. Fattibene

[57] ABSTRACT

A tractor-trailer fifth wheel suspension assembly which includes a mounting frame adapted to be suitably connected to a tractor body frame and a movable frame for supporting the fifth wheel mounted for parallel vertical movement relative to the mounting frame, and having opposed complementary stabilizing guide members connected to the respective frames to stabilize and limit the relative movement therebetween. In one form of the invention, the movable frame is supported on the mounting frame by a four-point air suspension system to effect relative parallel vertical movement between the respective frames and which function to automatically laterally and longitudinally stabilize the trailer load relative to the tractor when hauling. In another form of the invention, the movable frame is pivotally connected to the mounting frame at one end and adjustably suspended upon a two point air suspension system at the other end and having complementary guide and stop members to limit the relative vertical movement therebetween. Each of the respective embodiments may be rendered adjustable longitudinally relative to the tractor body frame.

9 Claims, 9 Drawing Sheets

TRACTOR-TRAILER FIFTH WHEEL AIR SUSPENSION ASSEMBLY

FIELD OF THE INVENTION

This invention relates to a tractor-trailer fifth wheel assembly, and more particularly to a fifth wheel assembly arranged to provide for limited vertical adjustment to facilitate the initial hitching of the tractor to the trailer and in the hitched position to allow the driver to control the load ride, trailer level, and to stabilize the trailer load to existing ground conditions.

This application further relates to Document Disclosure filed Jan. 21, 1994 for Air Ride Tractor Truck Fifth Wheel.

PROBLEM AND PRIOR KNOWN ART

Most tractors used for hauling large trailers are generally provided with a fifth wheel which is pivotally mounted between trunnions fixedly secured to the tractor body frame. To effect a hook-up between tractor and trailer, it was heretofore required for the tractor to be backed up at a considerable speed to engage the trailer box pin to the tractor's fifth wheel. Invariably, considerable force is required and the driver is subjected to a considerable impact on hook-up. Frequently, numerous attempts are required to effect the hook-up, and particularly by the less experienced drivers. Such hook-ups are not only dangerous, but they subject the tractor and trailer to excessive wear and tear, e.g. by the resulting tire spinning and clutch and axle wear and tear. Such hook-ups are aggravated if the trailer is parked on unlevel ground which provides for insufficient height for receiving the fifth wheel hitch mounted on the tractor body. The known fifth wheel hook-ups also do not provide for an easy level ride when hauling because of the relatively rigid connection between the tractor fifth wheel and the trailer body pin.

Various efforts have been made to improve and/or vary the manner in which the fifth wheel hook up is achieved in the tractor-trailer art. The various known efforts are disclosed in U.S. Pat. Nos. 4,580,806; 4,838,753; 5,060,964; 5,203,850 and 5,226,675. While the foregoing noted patents address various problems, it is not known that the constructions disclosed therein have achieved any wide acceptance.

An object of this invention is to provide an improved fifth wheel suspension system to facilitate the initial hitching of a tractor to a trailer, and to enable the trail load to be laterally and longitudinally stabilized during hauling.

Another object is to provide the improved fifth wheel suspension assembly that can be readily longitudinally adjusted relative to the tractor body frame.

Another object is to provide an improved fifth wheel suspension which is controllable by the driver to adjust for varying road conditions.

Another object is to provide for an improved fifth wheel suspension which lessens driver fatigue and increases safety.

Another object is to provide for an improved fifth wheel suspension capable of providing both lateral and longitudinal stability to the trail load relative to the tractor.

Another object is to provide for an improved fifth wheel suspension assembly which is rendered self adjusting to variable road conditions.

SUMMARY OF THE INVENTION

The foregoing objects and other features of the invention are attained by a mounting frame which is suitably connected to the tractor body or chassis. A fifth wheel undercarriage or movable frame is movably supported on the mounting frame. In one form of the invention, the mounting frame is provided with opposed brackets adjacent the opposed ends of the mounting frame for supporting thereon a heavy duty expandable air bag. The fifth wheel undercarriage or frame is supported on and secured to the respective air bags. The arrangement is such that the movable undercarriage or frame is movably connected to the mounting frame whereby the fifth wheel undercarriage is rendered vertically displaceable relative to the mounted frame. Stabilizing guide members are connected to each opposed side of the undercarriage or movable frame and arranged to be slidably received within a complementary guide sleeve secured to the opposed sides of the mounting frame. The respective guide members are slidably received within its respective guide sleeve to guide and stabilize the vertical displacement or movement of the fifth wheel undercarriage or frame relative to the mounting frame. Complementary stop means are provided on the guide member and associated guide sleeve to limit the vertical displacement of the fifth wheel undercarriage or frame and the mounting frame. In this form of the invention, the movable frame is supported for both lateral and longitudinal stability whereby the fifth wheel can be readily raised and lowered relative to the mounting frame. The movable undercarriage or fifth wheel support includes a pair of opposed trunnions for pivotally supporting the fifth wheel relative to the movable frame. The suspension assembly may be either fixedly secured to a tractor body or chassis or may be rendered longitudinally adjusted relative to the tractor body or chassis.

In another form of the invention, the fifth wheel undercarriage or frame is pivotally mounted relative to the mounting frame whereby the ends of the movable frame, remote from the cab of the tractor, are supported on corresponding air bags whereby the remote ends of the movable frame can be raised or lowered about its transverse pivot. The fifth wheel undercarriage or movable frame of this embodiment may be either fixed to tractor body or be rendered longitudinally adjustable relative to the tractor body or chassis.

A feature of this invention resides in the provision of a readily simple and efficient fifth wheel suspension assembly which may be either fixedly secured or adjustably mounted to a conventional tractor body or chassis.

Another feature resides in a fifth wheel suspension assembly which may be incorporated as an original and integral part of a tractor body or as a unit which can be readily attached to a tractor body as an after-market accessory.

Another feature resides in the fifth wheel suspension assembly having a fifth wheel that can be raised or lowered to facilitate hitching a tractor to a trailer in a simple, quick and safe manner.

Another feature resides in a fifth wheel suspension in which the fifth wheel is supported upon inflatable air bags which are rendered self leveling when the trailer is being hauled.

Another feature resides in providing a fifth wheel movable undercarriage or frame with opposed guide members for stabilizing and limiting the relative movement between the fifth wheel undercarriage and the mounting frame.

Another feature resides in the provision that the mounting frame comprises a pair of identical frame sub-assemblies mounted to opposed side members of a tractor body or chassis.

Another feature resides in the provision that the fifth wheel suspension assembly is relatively simple in operation, can be readily manufactured, and relatively inexpensive to fabricate.

IN THE DRAWINGS

DETAILED DESCRIPTION

Figure 2:
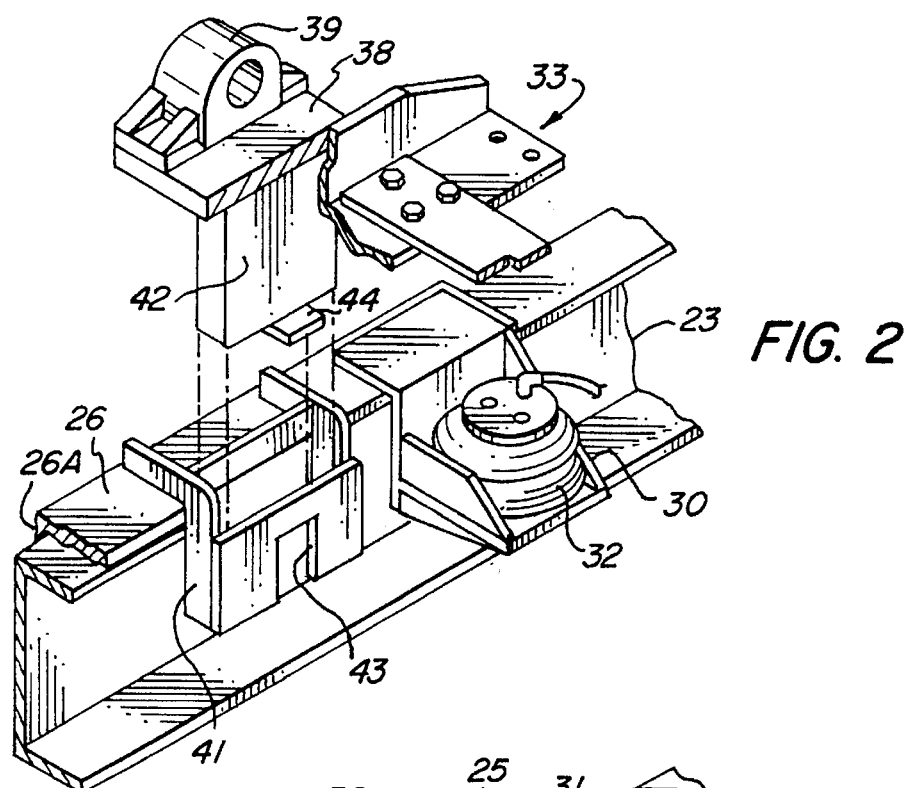
FIG. 2 is a perspective exploded view of a fragmentary portion of FIG. 1.
Figure 1:
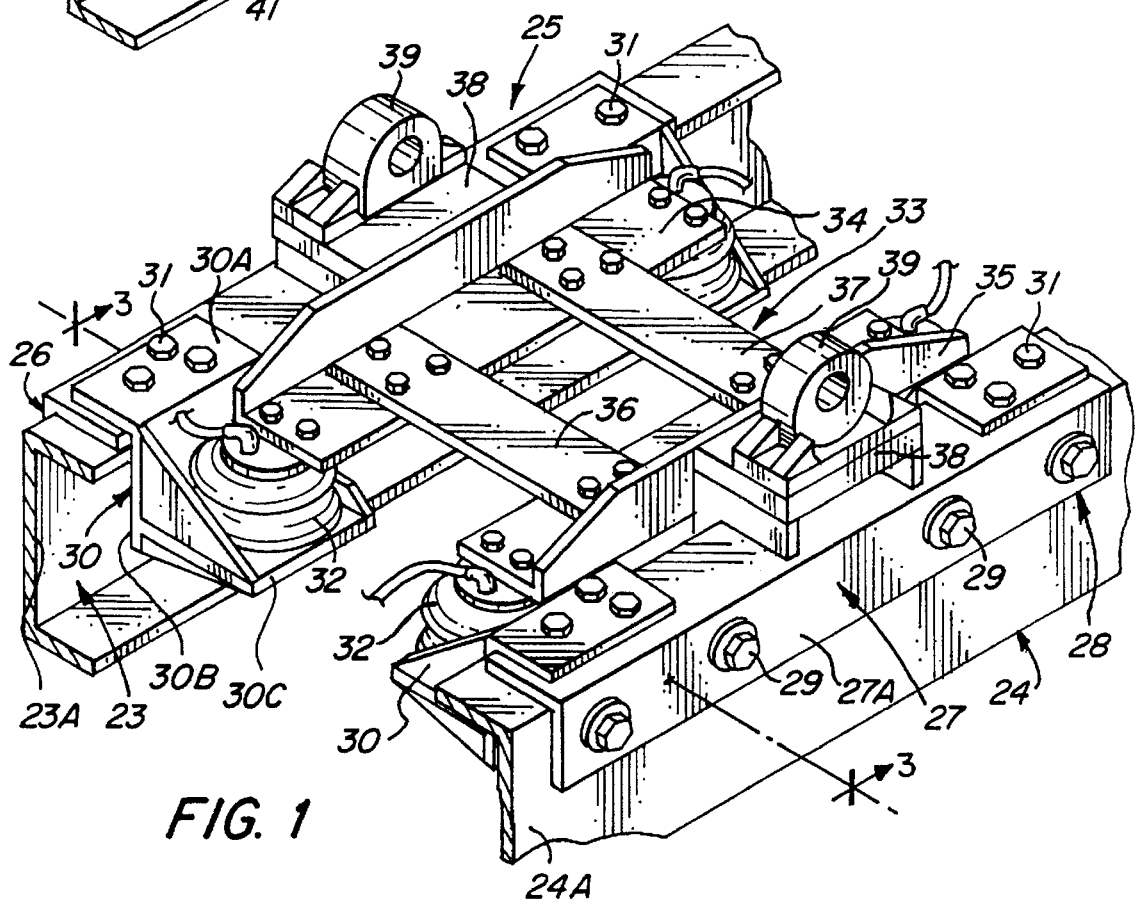
FIG. 1 is a perspective view of one form of the invention.
Figure 3:
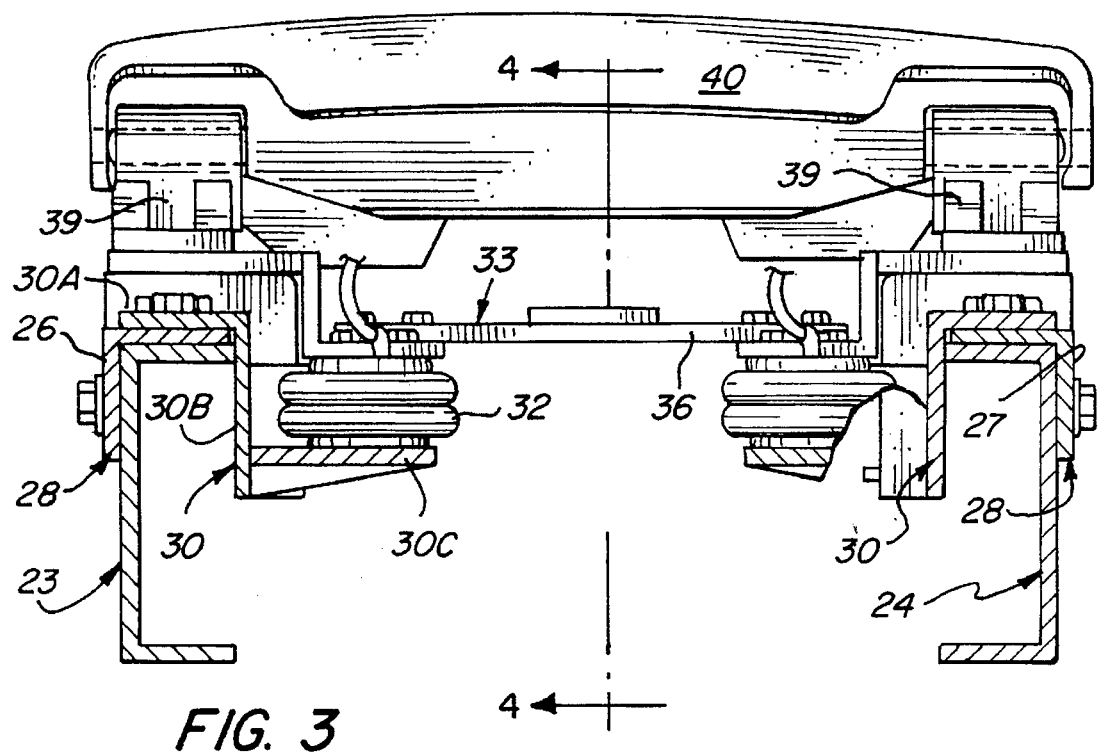
FIG. 3 is a sectional view taken along line 3—3 on FIG. 1, illustrating the fifth wheel in its lowest most position.
Figure 1A:
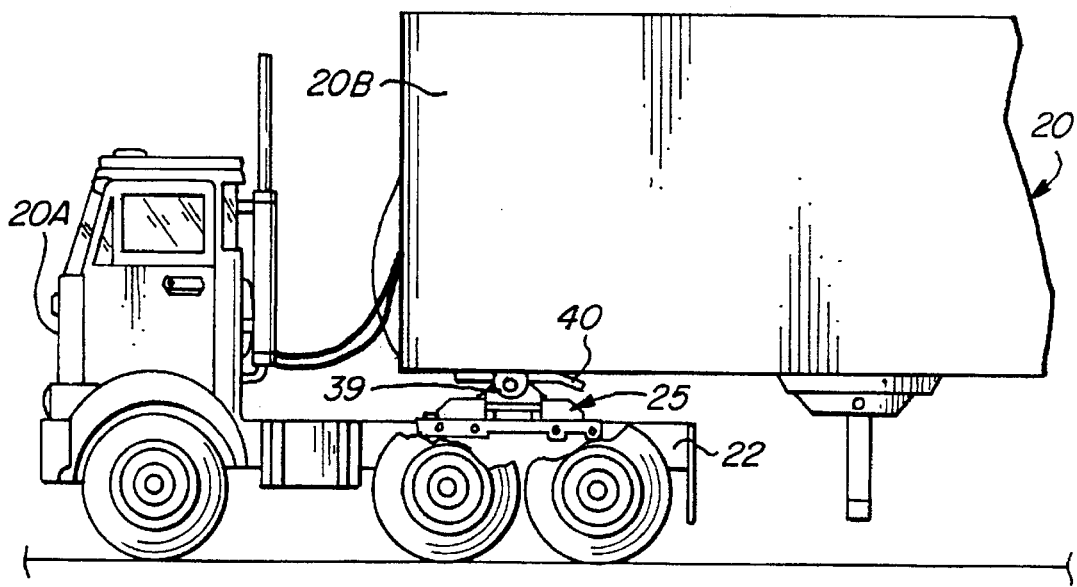
FIG. 1A illustrates a tractor and trailer for illustrating the environment in which the invention is used.

Referring to the drawings, there is shown in FIG. 1A a tractor and trailer unit 20 to which the invention relates. The tractor 20A has a body or chassis 22, which generally comprises a pair of opposed longitudinally extending channel members 23 and 24. Supported on the tractor's chassis 22 is a fifth wheel suspension assembly 25 embodying the present invention. As seen in FIGS. 1 and 2, one embodiment of the fifth wheel suspension assembly 25 comprises a pair of opposed angled members 26, 27 which define the mounting frame 28. As best seen in FIG. 1, the respective angle members 26, 27 of the mounting frame 28 are suitably connected to their respective chassis members 23, 24 by suitable bolts 29 extending through flange 26A, 27A of the angled members 26, 27 and the associated web 23A, 24A of the chassis channels 22, 23.

Connected adjacent the opposed ends of the respective angle members 26, 27 of the mounting frame 28 is a Z shaped bracket 30. The upper flange 30A of the respective Z shaped brackets 30 is secured to the upper flange of the respective angle members 26, 27 by suitable bolts 31. As seen in FIG. 1, the web 30B of the Z shaped bracket 30 depends downwardly from the top flange of the respective chassis members 23, 24 whereby the laterally extending bottom flange 30C defines the support for an air bag 32. As best seen in FIG. 1, the respective Z shaped brackets 30 each support an air bag 32.

Mounted on the respective air bags 32 is a movable frame 33. The movable frame 33 comprises a pair of longitudinally extending angles 34, 35 interconnected by cross plates 36, 37. Connected to and extending laterally outwardly of the movable frame angles and intermediate the ends thereof is a plate 38, 38 for supporting a trunnion 39 between which the fifth wheel 40 is pivotally supported on a support rod 40A interconnected between the opposed trunnions 39. It will be understood that the fifth wheel 40 is of a conventional construction.

Figure 4:
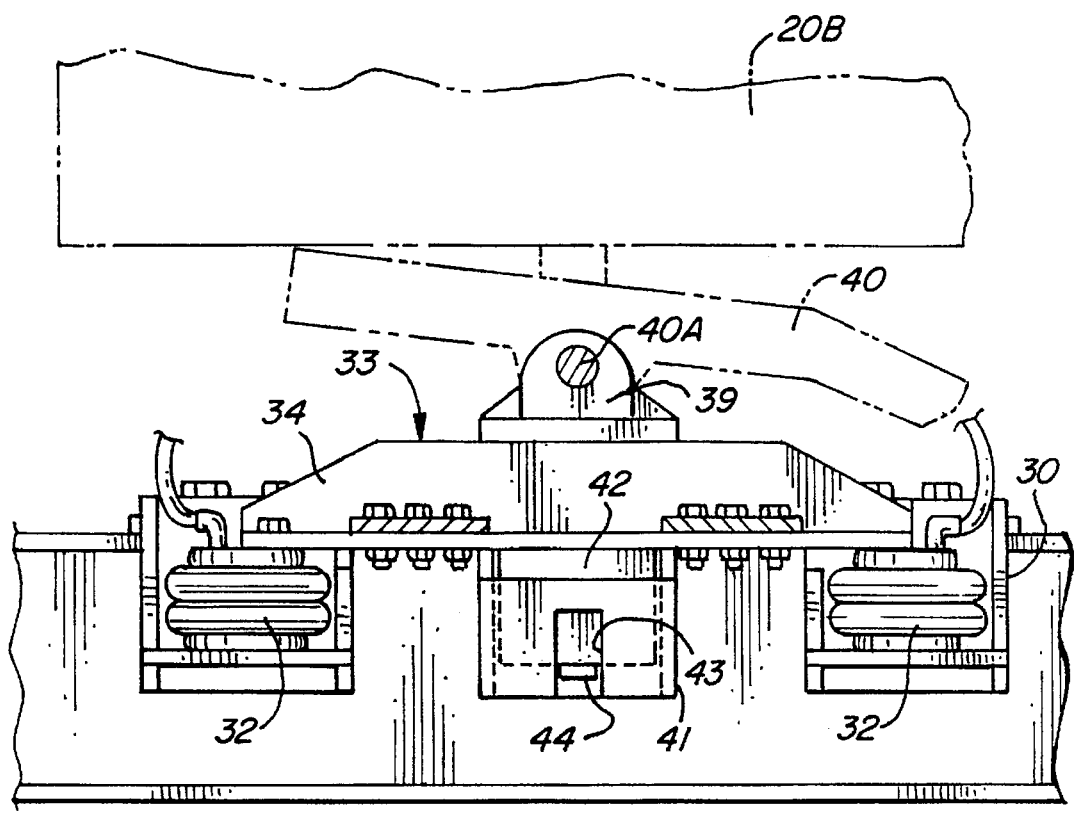
FIG. 4 is a sectional view taken along line 4—4 on FIG. 3.
Figure 5:
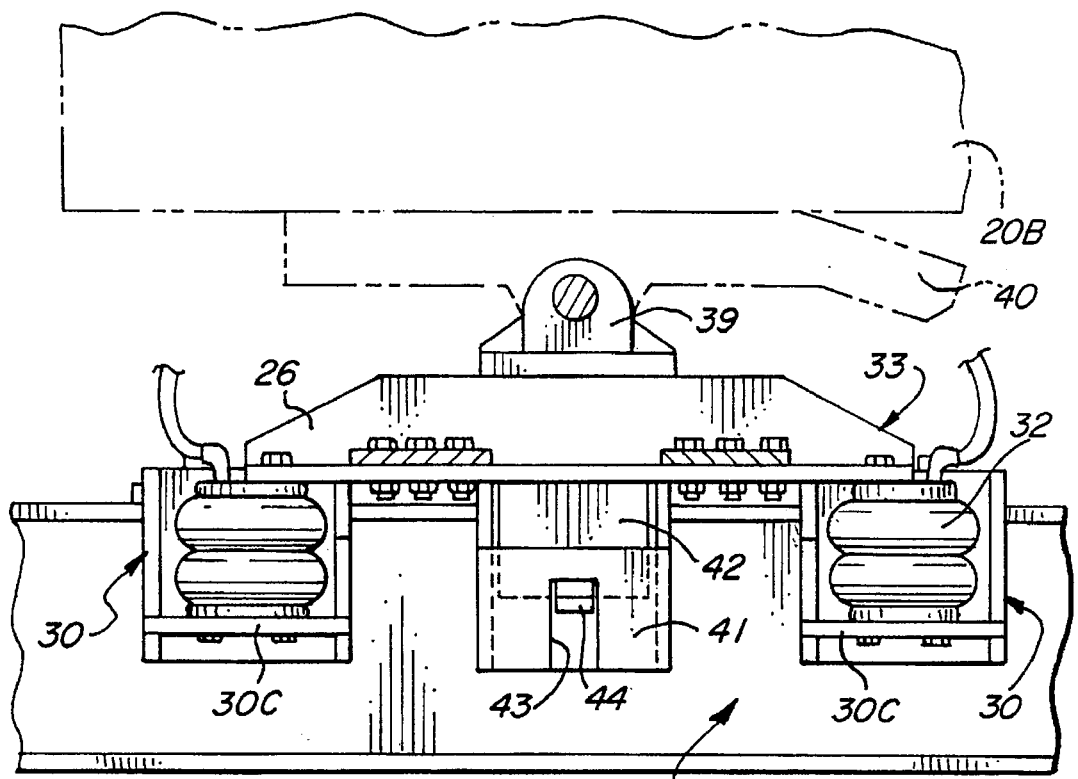
FIG. 5 is an inside side view of the fifth wheel suspension of FIGS. 1 to 4 shown in the raised position.
Figure 6:
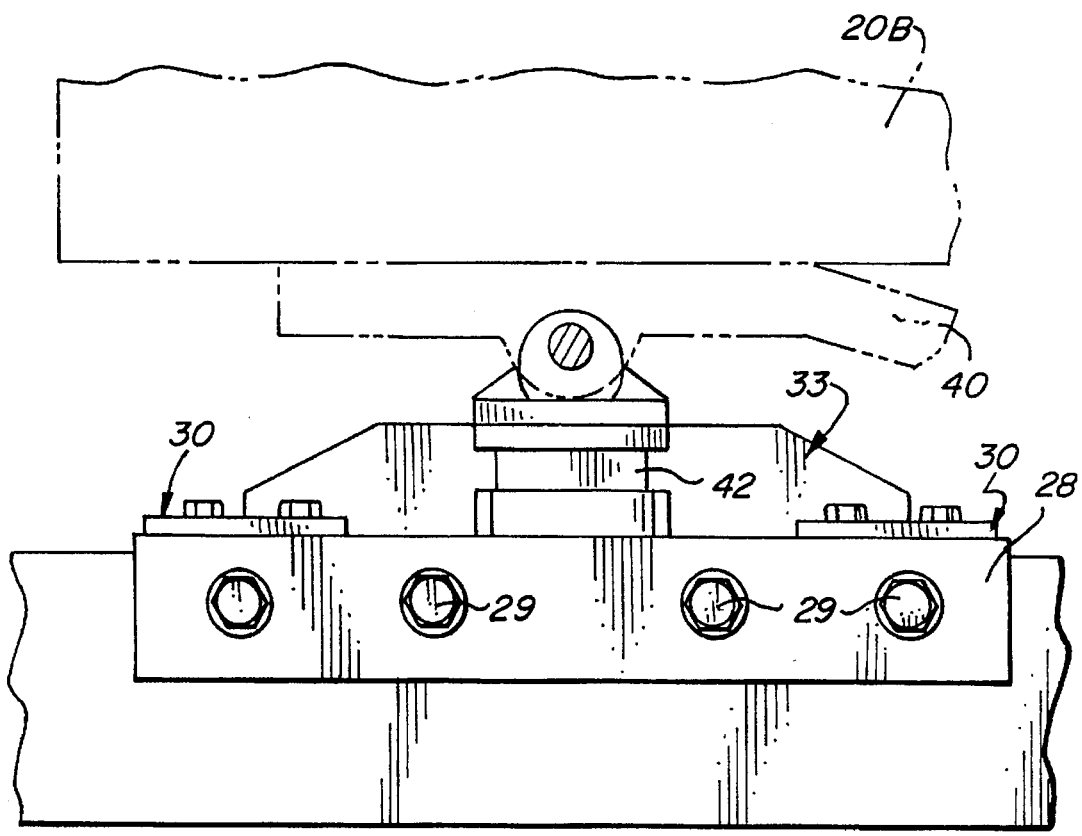
FIG. 6 is an outside side view of the fifth wheel suspension of FIGS. 1 to 4 shown in a raised position.

To stabilize and guide the movable frame 33 relative to the mounting frame 28, as will be herein described, there is provided a complementary slide interconnection between the mounting frame 28 and the movable frame 33. As best seen in FIG. 2, the mounting frame 28 is provided on each side thereof and intermediate the ends thereof with a guide sleeve or guideway 41 for receiving a slide 42 which is connected to the trunnion support plate 38. The arrangement is such that the complementary guideway or guide sleeve 41 and slide 42 function to stabilize and guide the movable frame 33 relative to the mounting frame 28. To limit the upward movement of the movable frame 33, the sleeve 41 is provided with a stop notch 43, as best seen in FIGS. 2, 4, and 5. The slide 42 is provided with a lateral extending stop 44 which projects through notch 43 so as to limit the upper movement of the movable frame 33 relative to the mounting frame 28.

It will be understood that the respective air bags 32 are connected in a control circuit to the air compressor system of the tractor 20A. The control panel or dashboard of the tractor is provided with an up and down switch which actuates an appropriate solenoid or control valve for directing the actuating medium, e.g. compressed air to and from the respective air bags 32. A pressure regulator, gage, and equalizing valves are incorporated in the control circuit is a well known manner. In the inoperative position, the air bags 32 are normally in a deflated state. In the deflated stage, the movable frame 33 and the fifth wheel supported thereon are in the most lower-most position.

In operation, the movable frame 33 and the fifth wheel supported thereon, with the air bags in a deflated state are disposed in its lowered position. In this position, the tractor 20A can be readily hitched to a trailer 20B, simply by backing the tractor 20A toward the trailer 20B. Because the movable frame 33 and fifth wheel are in the lowermost position, the fifth wheel 40 easily clears the bottom of the trailer 20B to engage the trailer hitch pin without any "bang". With the trailer hitch pin engaged with the locking slot of the fifth wheel, the driver simply actuated the "up" switch to inflate the respective air bags 32, causing the fifth wheel to raise whereby the trailer hitch pin can be securely locked to the fifth wheel. In hauling, the respective air bags 32 function like shock absorbers to reduce any shocks caused by road bumps or road hazards from being transmitted to the cab of the tractor, thereby reducing fatigue and shocks to which the driver is otherwise subjected.

In the arrangement described, the fifth wheel suspension assembly allows the load to be laterally and longitudinally stabilized. For example, when the road is provided with a high crown, the load of the trailer 20B would tend to shift to the low side of the crown. With the arrangement described, the pressure or amount of air in each of the air bags is adjusted so that the air bags on the low side of the crown will inflate as the air bags on the high side of the road crown may be deflated sufficiently to maintain the load of the trailer stable or level. This is attained by sensing valving located in the control circuit that will automatically actuate to inflate or deflate the appropriate air bags in accordance with the changing road conditions. The four point air bag system, as described in FIGS. 1 to 4, thus allows the trailer 20B to be stabilized from side to side as well as from front to back. With the construction described, it will be apparent that a much smoother and safer ride can be achieved with a minimum of driver fatigue and road shocks.

FIGS. 7, 8, 9, and 10 illustrate another embodiment of the invention. In this form of the invention, the movable frame 53 is mounted for pivotal movement relative to the fixed or mounting frame 50.

Figures 7, 8:
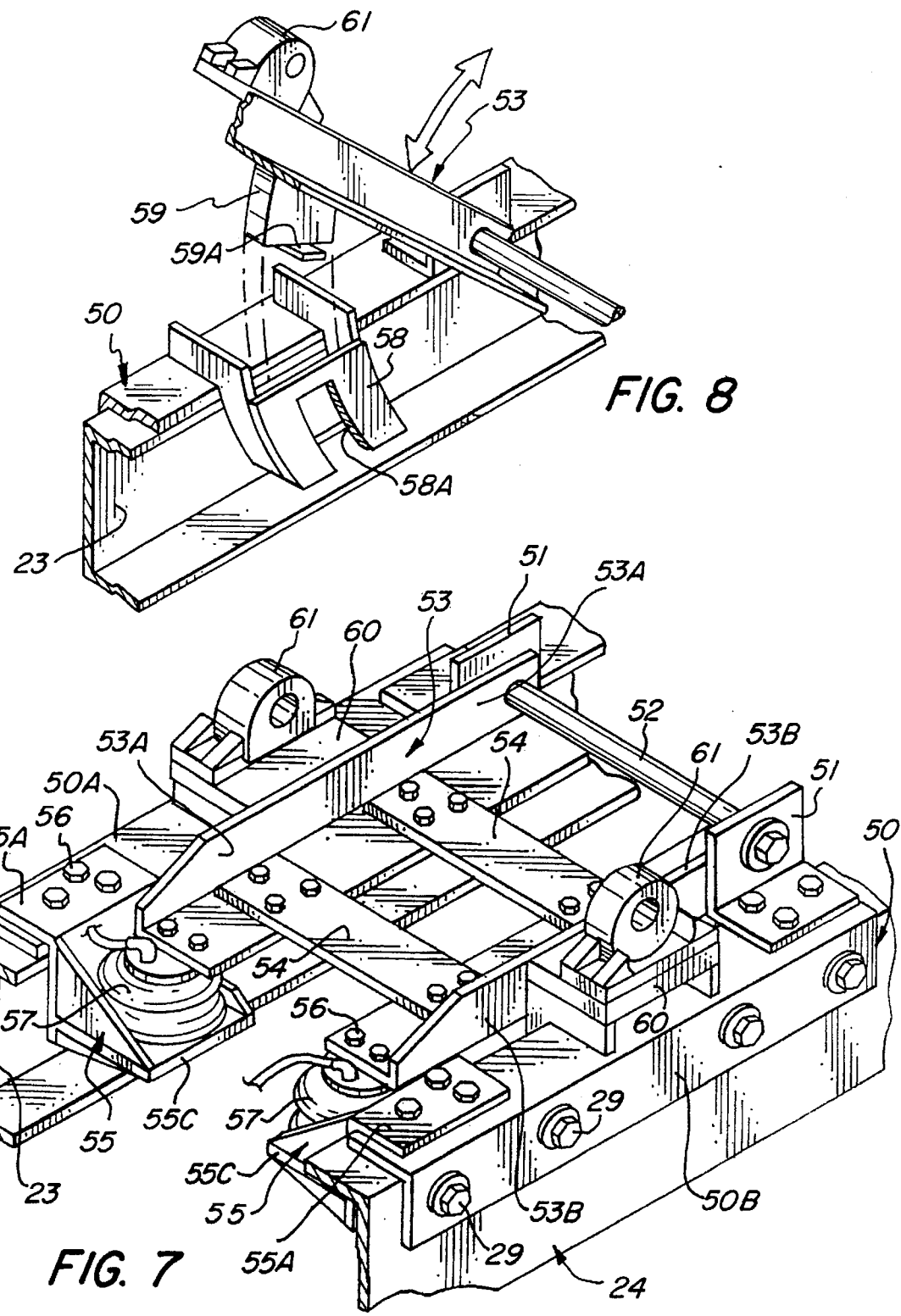
FIG. 7 is a perspective view of a modified form of the invention.
FIG. 8 is a perspective and exploded view of a fragmentary portion of FIG. 7.

As best seen in FIGS. 7 and 8, the mounting frame 50 comprises a mounting angle member 50A and 50B, which are fixedly secured to each of the tractor body chassis or channel members 23 and 24 by bolts 29 in a manner as hereinbefore described. Connected to the ends of the respective mounting angles 50A and 50B nearest to the cab of the tractor 20A is an angle bracket 51—51 interconnected by a pivot rod 52. Fixedly secured to the pivot rod 52 are the ends of the movable frame 53. The movable frame includes a pair of opposed angle members 53A, 53B interconnected by a pair of cross bars 54, 54.

Connected to the ends of the mounting frame remote from the cab of the tractor is a Z shaped bracket 55, similar to that previously described with respect to the previous embodiment. The top lateral flange 55A of the respective Z shaped brackets 55 is secured to the mounting frame angle by suitable bolts 56. The bottom lateral flange 55C provides a shelf for supporting an air bag 57, and which air bags 57 are suitably connected to and support the free ends of the movable frame 53.

Figure 9:
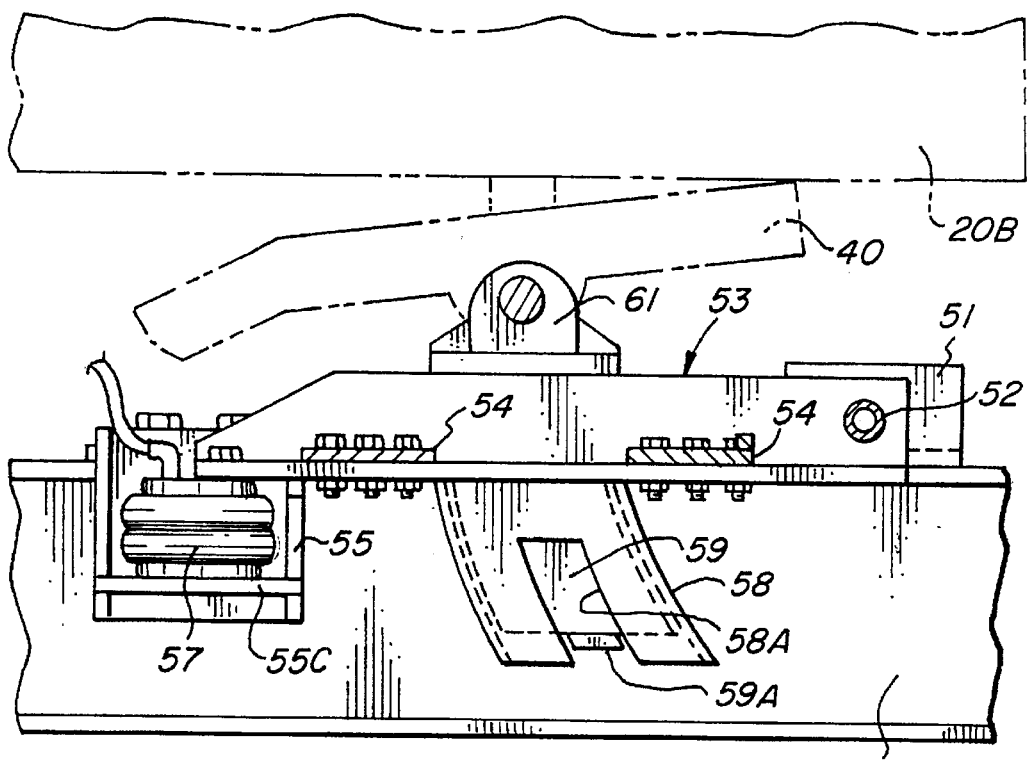
FIG. 9 is a side view of FIG. 7 illustrating the fifth wheel suspension in a lowered position.
Figure 10:
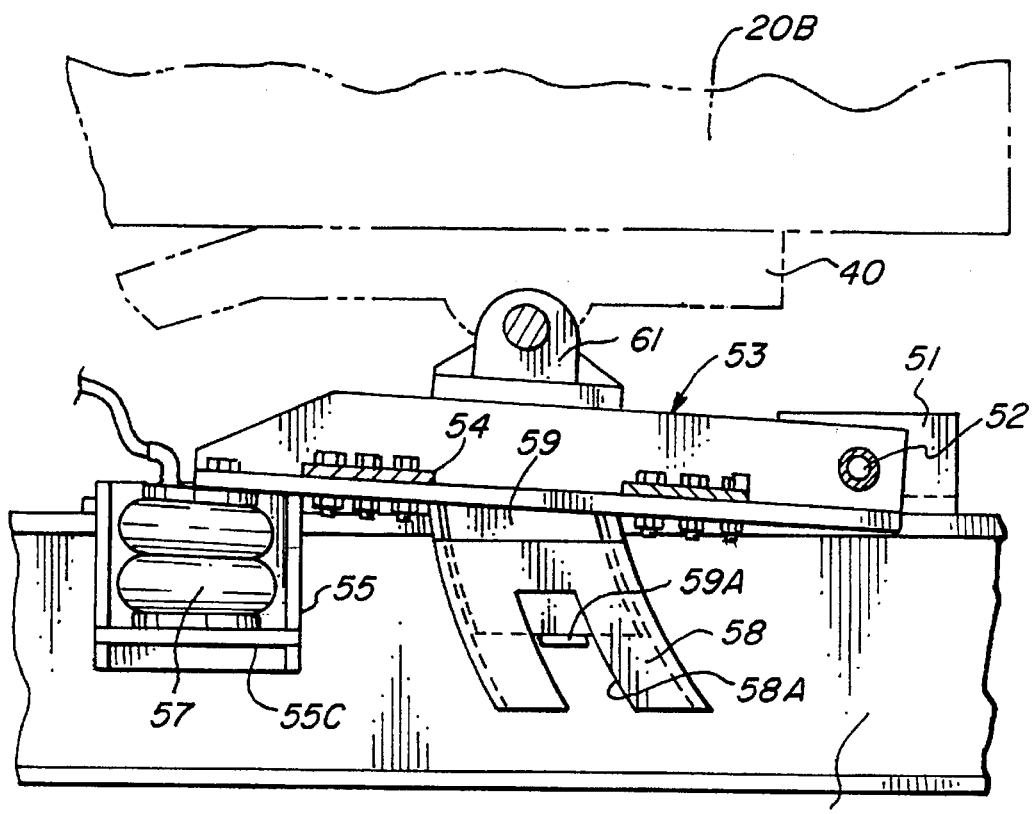
FIG. 10 is a side view similar to that of FIG. 9, but showing the suspension in a raised position.

As best seen in FIGS. 7 to 10, the mounting frame 50 intermediate the ends thereof is provided with a sleeve or guide 58 which is arranged to receive a slide 59 connected to the movable frame 53. Because the movable frame pivots relative to the mounting frame 50, the sleeve 58 is arcuate in shape as is the slide 59, as best seen in FIGS. 9 and 10. To limit the relative movement between the pivotable movable frame 53 and the fixed mounting frame, the side of the sleeve is provided with a stop notch 58A for receiving a lateral stop 59A connected to the slide 59, as noted in FIGS. 9 and 10.

Connected to the movable frame angle members 53A, 53B and extending laterally outwardly is a trunnion support 60 to which the trunnion 61 is connected for pivotally supporting the fifth wheel therebetween.

In this form of the invention, the movable frame 53 and the fifth wheel 40 supported thereon are lowered to their lowermost position when the air bags 57, 57 are deflated, so as to permit the tractor to be readily backed up into hitching position with the trailer without "banging" the tractor into the trailer. With the trailer 20A backing into the trailer, the trailer hitch pin is engaged by the fifth wheel. The air bags 57, 57 are then inflated to raise the fifth wheel 40 into hitching position as seen in FIG. 10. In inflating the air bags 57, 57, the movable frame 33 is rotated about the pivot rod 52 whereby the fifth wheel is engaged and locked to the trailer hitch (not shown) in a conventional manner.

In hauling, the air bags 57, 57 are maintained in an inflated state so as to absorb any shocks or road bumps transmitted between the tractor and trailer to provide for a smoother and safer ride. The driver, by controlling the pressure of the air to be maintained by the air bags 57, 57 can then adjust the ride to the existing road conditions encountered.

Figure 11:
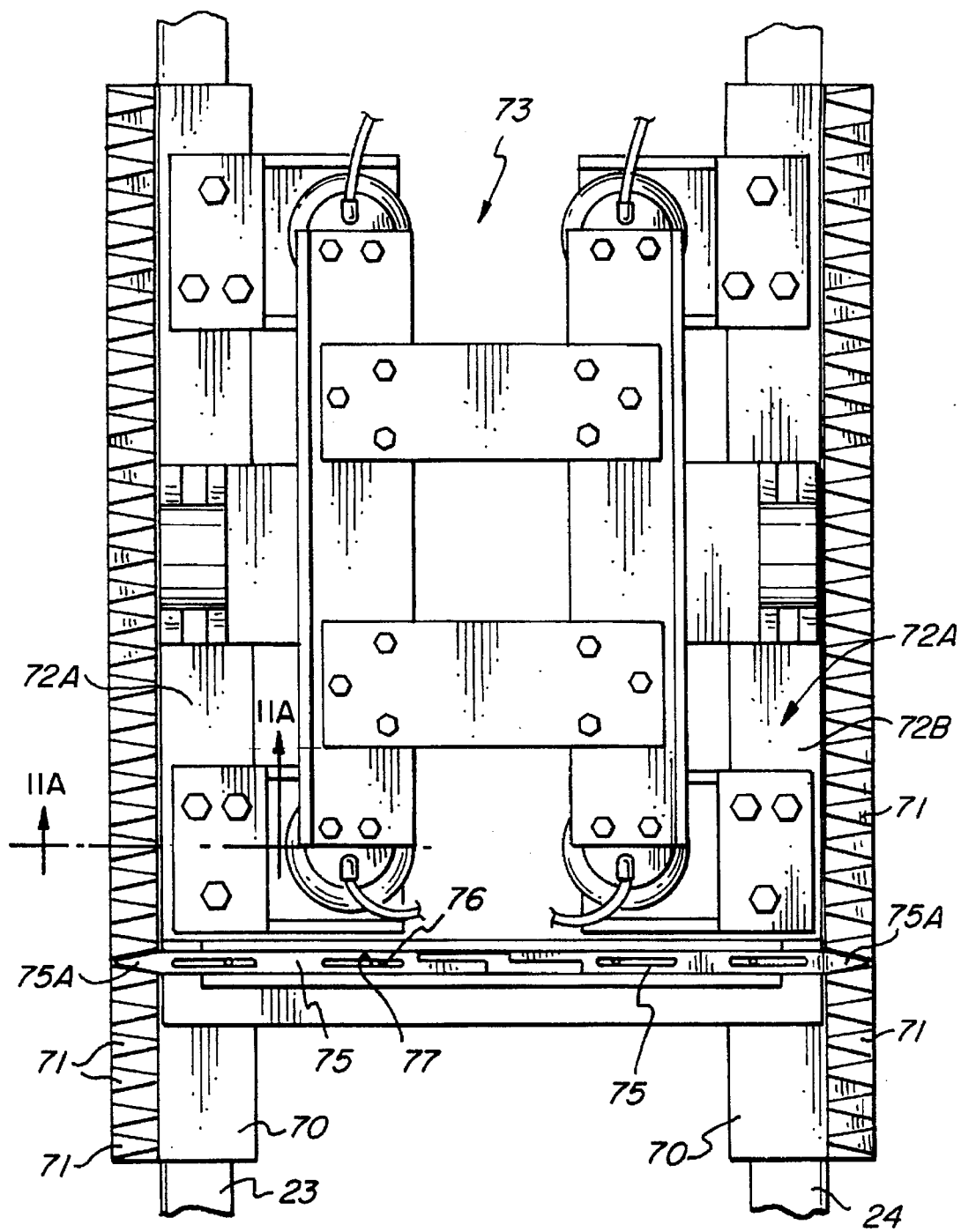
FIG. 11 is a top view of another modified fifth wheel suspension assembly.

FIG. 11 is a slightly modified form of the invention wherein the fifth wheel suspension assembly of FIGS. 1 to 6 can be longitudinally adjusted relative to the chassis of the tractor. As the trailers are not always of a standard construction, the position of the hitching pin may vary. To accommodate the tractor fifth wheel to engage the hitching pin of a given trailer, it may be necessary to shift the location of the fifth wheel relative to the chassis of the tractor. The embodiment disclosed in FIG. 11 provides a relatively simple means by which the fifth wheel suspension assembly of FIGS. 1 to 6 can be longitudinally adjusted along the chassis of the tractor 20A.

Figure 11A:
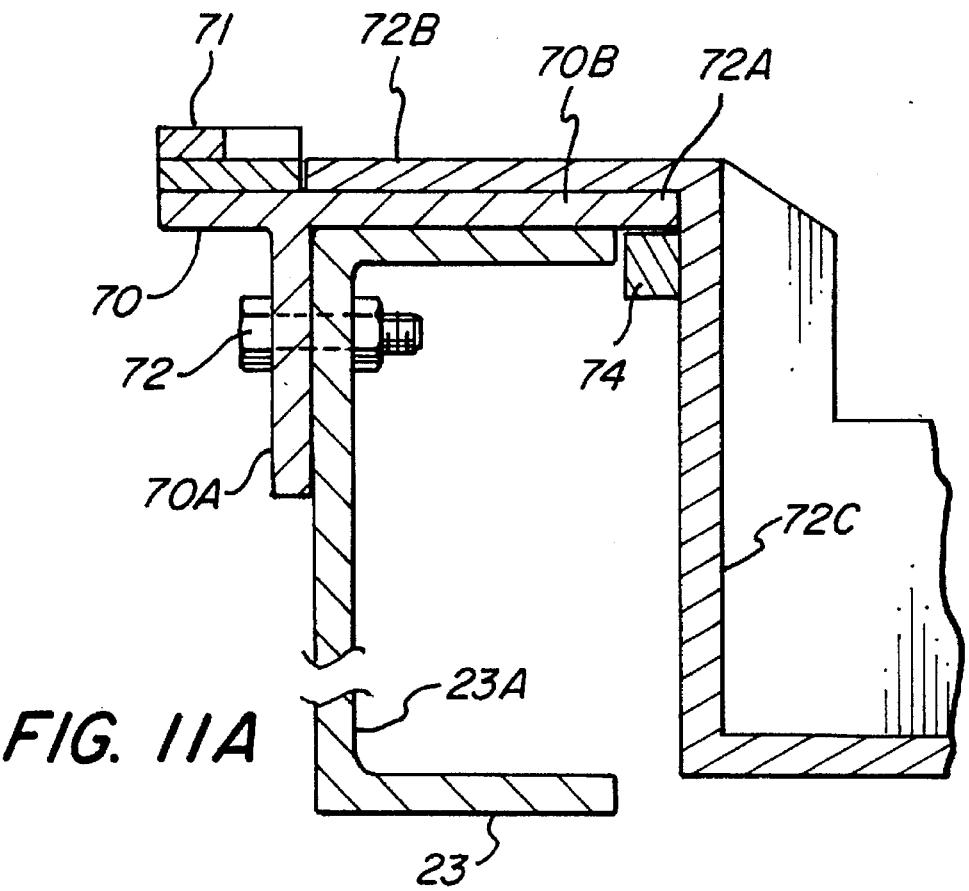
FIG. 11A is a detail of construction taken along line 11A—11A on FIG. 11.

In this form of the invention, a structural mounting member 70 is secured to the respective opposed chassis members 23 and 24 of the tractor 20A. As best seen in FIG. 11A, the structural member 70 comprises an elongated member having a T shaped cross-section, whereby the stem portion 70A of the T shaped member 70 is bolted to the corresponding web 23A of the respective chassis channels 22, 24 by blots 72. Along the outer edge of the cross head 70B of the opposed T shaped member 70 are a series of ratchet teeth 71.

In this form of the invention, the mounting frame 72A of the suspension assembly 73 is slidably supported on the opposed structural T shaped members 70—70 fixed to the tractor chassis 23, 24, for longitudinal adjustment thereal-ong. In this form of the invention, the mounting frame 72A may comprise an angled member having its horizontal flange 72B slidably supported upon the cross head 70B of the T shaped member 70, with the depending flange 72C being guided along the inner edge of the cross head 70B of the T shaped member. To maintain the mounting frame in sliding relationship relative to the T shaped members, a guide rail member 74 extends longitudinally of the mounting angle 72A, which is spaced from the horizontal flange 72B of the mounting frame 72A to define a channel way or track for receiving therebetween in sliding relationship the inner free end of the cross head 70B, as best seen in FIG. 11A.

To secure the slidably mounted frame 72A in its longitudinally adjusted position, a locking latch 75 is provided. As best seen in FIG. 11, a pair of opposed latching members 75, 75 are slidably mounted along an end portion of the mounting frame 72A. The respective latching members 75, 75 are provided with a projecting portion 75A, 75A for engaging the space between adjacent ratchet teeth 71 to maintain the mounting frame 72A in the fixed adjusted position. To release the mounting frame, the respective latching members are retracted to disengage the projecting portions 75A, 75A from the ratchet teeth 71, 71, whereby the mounting frame is free to be shifted longitudinally to another adjusted position as may be required. It will be understood that the latching members 75 can be maintained in a retracted or protracted position by a suitable actuator and/or may be manually actuated. As seen in FIG. 11, the respective latch members 75, 75 are provided with a pin 76 and slot 77 connection to provide for lateral shifting of the respective latch members 75, 75 between a latched and unlatched position. In all other respects, the suspension assembly of FIG. 11 is similar to that of FIGS. 1 to 6. Thus, the operation of the suspension system of FIG. 11 is identical to that described with respect to FIGS. 1 to 6 with the exception that in the embodiment of FIG. 11, the suspension system can be adjusted longitudinally relative to the tractor chassis, thereby enabling a tractor 20A, so equipped to have the fifth wheel suspension system described, adjusted to accommodate various trailers.

Figure 12:
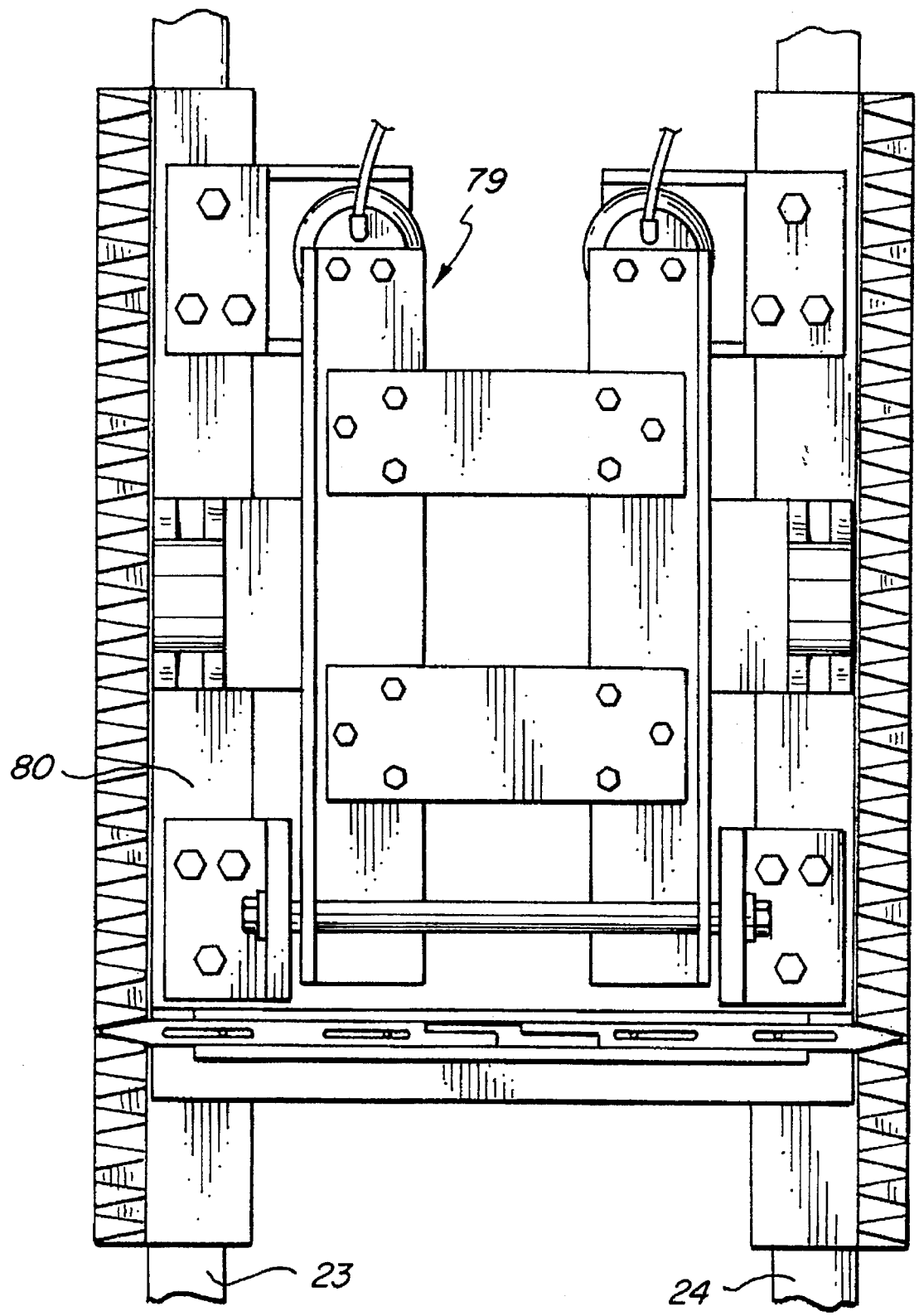
FIG. 12 is another modified form of the invention.

FIG. 12 illustrates a slightly modified form of the invention, wherein the fifth wheel suspension assembly 79 is as described with respect to FIGS. 7 to 10, except that it is rendered longitudinally adjustable relative to the longitudinal axis of a tractor chassis in a manner similar to that described with respect to FIGS. 11 and 11A. In other words, the mounting frame 80 in the embodiment of FIG. 12 is similar to the mounting frame described with respect to FIGS. 11 and 11A, and is rendered slidably adjustable on chassis 23 and 24 as described with respect to FIGS. 11 and 11A.

Figure 13:
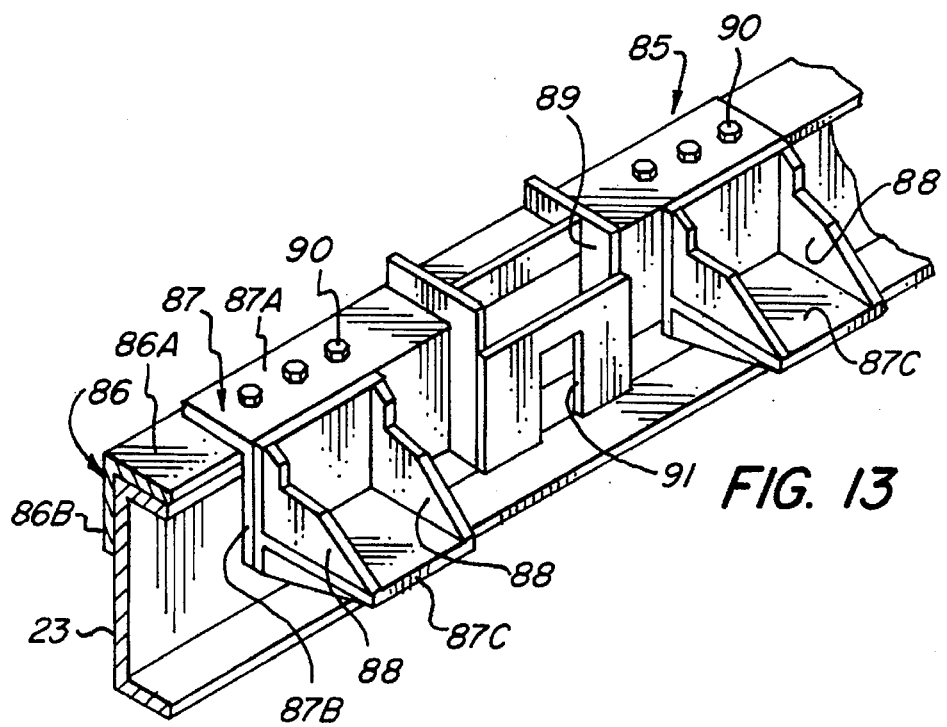
FIG. 13 is a perspective view of a modified mounting frame component for use in the embodiment of FIGS. 1 to FIG. 14 is a perspective view of another modified frame component.

FIG. 13 illustrates a perspective view of a slightly modified mounting frame for use in a suspension assembly such as described with respect to FIGS. 1 to 4. The modified mounting frame 85 includes an elongated mounting angle 86 with the horizontal flange 86A supported upon the upper flange of the chassis channel 23, 24 and the vertical flange 86B secured to the web of the associated chassis channel 23, 24, as hereinbefore described with bolts 29. In this form, the mounting frame includes an elongated angle member 87 having a co-extensive horizontal flange 87A secured to flange 86A of angle 86 by suitable bolts or studs 90. The depending flange 87B of member 87 depends so as to extend between the upper and lower flanges of the chassis channel 23, 24 respectively. Connected adjacent the ends of the angle 87 is a lateral flange 87C to provide the support or base for the air bag (not shown). Side gusset plate 88 secures and stabilizes the air bag flange or support 87C. Intermediate the ends of the angle member 87 there is formed a rectangular sleeve 89 to provide the guideway or guide sleeve for receiving the slide of the movable frame as hereinbefore described with respect to FIGS. 1 to 4. As previously described, the sleeve 89 is provided with a stop notch 91. In this form of the invention, the air bag supports 87C are formed as a unitary structure rather than formed of several separate parts as shown with respect to FIGS. 1 to 4. It will be understood that the mounting frame comprises a pair of structural members as illustrated in FIG. 13, which are oppositely disposed in the respective body chassis members 23, 24, as herein described.

Figure 14:
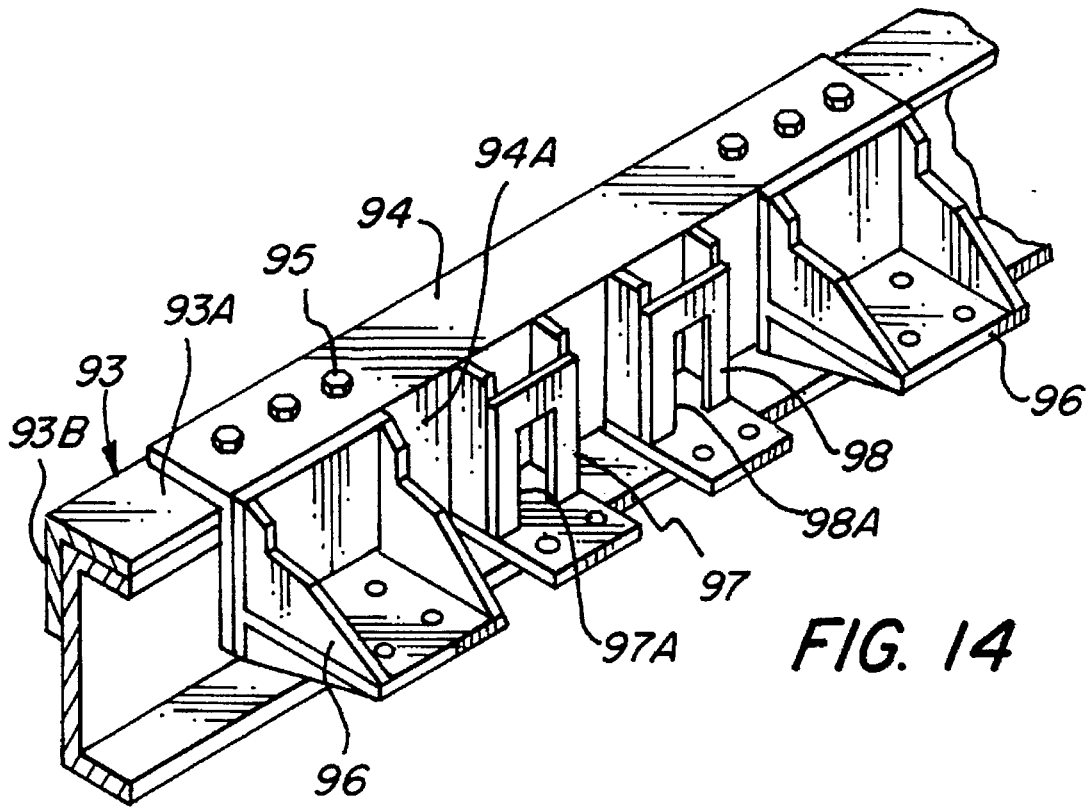

FIG. 14 illustrates another modified detail of construction relating to the mounting frame that may be utilized in the fifth wheel assembly as described with respect to FIGS. 1 to 4. In this form of the invention, the mounting frame includes an elongated mounting angle member 93 having a horizontal flange 93A and a vertical flange 93B whereby the horizontal flange 93A is arranged to be disposed upon the upper flange of the tractor chassis 23 or 24, and the depending flange 93B secured to the web of the tractor chassis 23 or 25 as hereinbefore described. A secondary mounting member 94 comprising an angled member is secured to the horizontal flange 93A by suitable bolts 95. The depending flange 94A has connected thereto adjacent the ends thereof a bracket 96 to define the support for the air bags as hereinbefore described.

In this embodiment of the mounting frame assembly, a pair of guide sleeves 97, 98 are fabricated to the depending flange 94A of member 94. As shown, each guide sleeve 97, 98 is provided with a stop notch 97A, 98A. It will be understood that the moveable frame assembly for use with the mounting frame sub-assembly of FIG. 14 is provided with a pair of slides arranged to be slidably received in the guide ways or guide sleeves 97, 98. In this form of the invention, the use of a pair of guide sleeves 97, 98 will render the vertical movement of the movable frame as described to be somewhat more stable. In all other respects, the use of the sub-assembly described with respect to FIG. 14 is similar to that hereinbefore described with respect to FIGS. 1 to 4.

While the present invention has been described with respect to various embodiments, various modifications may be made without departing from the spirit and scope of this invention.

What is claimed is:

1. A tractor-trailer fifth wheel suspension assembly comprising:

a mounting frame adapted to be supported upon opposed chassis members of a tractor chassis, said mounting frame including
      opposed structural members connected to each of said chassis members,
      a pair of brackets, one of said brackets being connected to each of said opposed structural members adjacent an end portion thereof,
      an air bag supported on each of said brackets,
   a movable frame,
      said movable frame including a pair of opposed movable frame structural members,
      cross members interconnected between said opposed movable frame structural members,
      one of said movable frame structural members being connected to one of said air bags,
   a trunnion connected to each of said movable frame structural members intermediate the ends thereof,
   a support rod interconnected between said trunnions,
   a fifth wheel pivotally mounted on said support rod,
   complementary guide means mounted on said movable frame and mounting frame for stabilizing relative movement therebetween,
   said guide means including a guide sleeve mounted on one of said frames, and
   a complementary slide mounted on the other of said frames, said slide being receivable within said guide sleeve, and
   stop means for limiting the relative movement between said frames when said air bags are actuated.

2. A tractor-trailer fifth wheel suspension assembly as defined in claim 1 and including:

a second pair of brackets, one of said second pair of brackets being connected to the other end of said opposed structural members, a second pair of air bags, one of said second pair of air bags being connected to one of said second pair of brackets, and said movable frame structural member having its other end support on one of said second pair of air bags.

3. A tractor-trailer fifth wheel suspension assembly as defined in claim 1 and including means for pivoting the other end of said movable frame relative to said mounting frame.

4. A tractor-trailer fifth wheel suspension assembly as defined in claim 1 wherein said mounting frame includes a first angled member fixedly secured to the chassis member of said tractor body, a second angled member connected to said first angled member, each of said first and second angled members having their respective depending flanges oppositely disposed to either side of the corresponding chassis member, and a bracket connected adjacent the opposed ends of said second angled member.

5. A tractor-trailer fifth wheel suspension assembly as defined in claim 4 and including a guide sleeve connected intermediate the ends of said second angled member and between said brackets.

6. A tractor-trailer fifth wheel assembly as defined in claim 5 wherein said guide sleeve includes a segmented guide sleeve to define a pair of spaced apart guide sleeves.

7. A tractor-trailer fifth wheel suspension assembly comprising:
- a mounting frame adapted to be supported upon the opposed chassis members of a tractor body,
- said mounting frame including opposed fixed structural members having a lateral flange adapted to seat on the opposed chassis members, and a depending stem disposed contiguous to the side of a corresponding chassis member, and a slidable member supported for relative sliding movement on each of said fixed structural members,
- said slidable members each having a depending flange,
- a bracket connected adjacent an end of each said slidable member,
- a rail member connected to each said slidable member to define a track for receiving the end of said lateral flange of each said fixed structure member of said mounting frame,
- a plurality of ratchet teeth connected to each of said fixed structural members,
- a latch connected transversely of said slidable members adapted to engage said ratchet teeth in the adjusted position thereof,
- an air bag supported in each of said brackets,
- a movable frame connected to said air bags whereby said movable frame is mounted for movement relative to said slidable members as said air bag inflates and deflates,
- complementary guide means connected to said movable frame and said slidable members,
- said guide means including a stop means to limit the relative movement of said movable frame relative to said slidable members,
- and a fifth wheel mounted on said movable frame.

8. A tractor-trailer fifth wheel suspension assembly as defined in claim 7 and including a second pair of brackets connected adjacent the other end of said slidable members,
- an air bag mounted on each of said second pair of brackets,
- said movable frame being connected to each of said air bags for parallel movement relative to said slidable members as said air bags inflate and deflate.

9. A tractor-trailer fifth wheel assembly as defined in claim 7 and including means for pivotally mounting the other end of said movable frame to said slidable members whereby said movable frame is mounted for angular movement relative to said slidable members as said air bags inflate and deflate.

* * * * *